US010171348B2

(12) United States Patent
Hasegawa et al.

(10) Patent No.: US 10,171,348 B2
(45) Date of Patent: Jan. 1, 2019

(54) COMMUNICATION CONTROL DEVICE, COMMUNICATION CONTROL SYSTEM, COMMUNICATION CONTROL METHOD, AND COMMUNICATION CONTROL PROGRAM THAT SELECTS A FUNCTION TO BE USED FROM FAILURE RECOVERY FUNCTIONS SUPERPOSED BY LAYER

(71) Applicant: NEC Corporation, Tokyo (JP)

(72) Inventors: Yohei Hasegawa, Tokyo (JP); Atsushi Iwata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 115 days.

(21) Appl. No.: 15/025,746

(22) PCT Filed: Apr. 25, 2014

(86) PCT No.: PCT/JP2014/061658
§ 371 (c)(1),
(2) Date: Mar. 29, 2016

(87) PCT Pub. No.: WO2015/045466
PCT Pub. Date: Apr. 2, 2015

(65) Prior Publication Data
US 2016/0241465 A1 Aug. 18, 2016

(30) Foreign Application Priority Data

Sep. 30, 2013 (JP) ................................. 2013-203900

(51) Int. Cl.
H04L 12/703 (2013.01)
H04L 12/707 (2013.01)
(Continued)

(52) U.S. Cl.
CPC .......... *H04L 45/28* (2013.01); *H04L 41/0631* (2013.01); *H04L 45/22* (2013.01); *H04L 49/557* (2013.01)

(58) Field of Classification Search
CPC ..... H04L 45/28; H04L 45/22; H04L 41/0631; H04L 49/557; H04L 45/12; H04L 41/064
(Continued)

(56) References Cited

U.S. PATENT DOCUMENTS 6,718,480 B1    4/2004 Ogura et al.
7,043,662 B2    5/2006 Shiragaki
(Continued)

FOREIGN PATENT DOCUMENTS

JP    2000-278285    10/2000
JP    2002-330131    11/2002
(Continued)

OTHER PUBLICATIONS

International Search Report, PCT/JP2014/061658, dated Aug. 5, 2014.
(Continued)

Primary Examiner — Paul H Masur
(74) Attorney, Agent, or Firm — Young & Thompson

(57) ABSTRACT

A communications control device that, if a communications failure occurs at location in a first path for communications that extends across a plurality of communications layers, selects any second path from a candidate group including at least one second path for continuing communications without going via the location where the communications failure has occurred, on the basis of the time required for each second path to switch from the first path to the second path, and sends, to a communications device for performing the switching, an instruction for switching the first path to the selected second path and continuing communications.

20 Claims, 13 Drawing Sheets

(51) Int. Cl.
*H04L 12/24* (2006.01)
*H04L 12/939* (2013.01)

(58) Field of Classification Search
USPC .................................................. 370/216–228
See application file for complete search history.

(56) References Cited

U.S. PATENT DOCUMENTS

| | | | |
|---|---|---|---|
| 2002/0162045 A1 | 10/2002 | Shiragaki | |
| 2005/0188242 A1* | 8/2005 | Rabbat .................... | H04L 45/02 |
| | | | 714/4.2 |
| 2012/0281523 A1* | 11/2012 | Huber .................. | H04L 41/0663 |
| | | | 370/217 |
| 2013/0258841 A1* | 10/2013 | Parsons ................. | H04L 41/142 |
| | | | 370/228 |

FOREIGN PATENT DOCUMENTS

| | | |
|---|---|---|
| JP | 2003-258907 | 9/2003 |
| JP | 2005-204317 A | 7/2005 |
| JP | 2005-236489 A | 9/2005 |
| JP | 2008-167382 | 7/2008 |
| JP | 2009-246721 | 10/2009 |
| JP | 2011-199706 | 10/2011 |
| JP | 2012-231531 A | 11/2012 |

OTHER PUBLICATIONS

Japanese Office Action issued in Application No. 2015-538936, dated May 15, 2018 with English Translation.

* cited by examiner

FIG. 4

PATH DATABASE

| PATH (END POINT, THROUGH NODE, THROUGH LINK) |
|---|
| PATH 501 (END POINT 201, 202<br>        THROUGH NODE=301, 401, 403, 302<br>        THROUGH LINK=L1, L3, L5-1, L8, L10)<br>PATH 502 (END POINT 201, 202<br>        THROUGH NODE=301, 402, 404, 302<br>        THROUGH LINK=L1, L2, L6, L9, L10)<br>PATH 503 (END POINT 301, 302<br>        THROUGH NODE=401 403,<br>        THROUGH LINK= L3, L5-1, L8)<br>PATH 504 (END POINT 301, 302<br>        THROUGH NODE=401, 402, 404, 403<br>        THROUGH LINK=L3, L4, L6, L7, L8)<br>PATH 505 (END POINT 401, 403<br>       THROUGH NODE=<br>       THROUGH LINK=L5-1)<br>PATH 506 (END POINT 401, 403<br>       THROUGH NODE=<br>       THROUGH LINK=L5-2) |

FIG. 11

FAILURE OCCURRENCE REPORT
NOTIFICATION FROM
COMMUNICATION DEVICE

```
SIGNAL ID
NODE ID
FAILURE PLACE ID
 (LINE ID,
 LOGICAL LINE ID,
 FLOW ID)
```

FIG. 12

COMMUNICATION FAILURE RECOVERY TIME STORAGE UNIT

| T(FIRST PATH, SECOND PATH)[SECONDS] |
|---|
| T(PATH 501, PATH 502)=0.5 SECOND |
| T(PATH 503, PATH 504)=2 SECONDS |
| T(PATH 505, PATH 506)=0.2 SECOND |

FIG. 13

RECOVERY EXECUTION INSTRUCTION
FROM COMMUNICATION CONTROL
DEVICE

SIGNAL ID
NODE ID
TRANSMISSION SETTING
FILTER CONDITION
 (INPUT LINE ID,
 INPUT LOGICAL LINE ID,
 ARBITRARY PLACE OF
PACKET)
OUTPUT DESTINATION
 (OUTPUT LINE ID,
 OUTPUT LOGICAL LINE ID,
 OUTPUT DESTINATION)

COMMUNICATION CONTROL DEVICE, COMMUNICATION CONTROL SYSTEM, COMMUNICATION CONTROL METHOD, AND COMMUNICATION CONTROL PROGRAM THAT SELECTS A FUNCTION TO BE USED FROM FAILURE RECOVERY FUNCTIONS SUPERPOSED BY LAYER

TECHNICAL FIELD

The present invention relates to a communication control device, a communication control system, a communication control method, and a communication control program, by which a communication failure among communication devices is recovered.

BACKGROUND ART

In recent years, it is general to hierarchically superpose similar functions to a network and to use functions of each hierarchy.

In a detailed example, a communication failure recovery function is provided to each of a plurality of superposed hierarchies (also called layers) such as IP (Internet Protocol), MPLS (Multi Protocol Label Switching), and Ethernet (a registered trademark). Furthermore, when a communication failure has occurred on a path, each layer detects the failure by its own communication failure recovery function.

Herein, in such a multi-layer network, there is a tendency that a failure detection time and failure recovery are shorter in a lower layer and the failure detection time and the failure recovery become longer in an upper layer. The general reason for this is because a communication section is shorter and a connection with physical resources is stronger in the lower layer than the upper layer, so that it is possible to expect high speed communication failure detection and failure recovery in the lower layer than the upper layer.

Therefore, it is general to use a policy that the upper layer expects failure recovery in the lower layer and waits without performing communication failure detection at the shortest time for which communication failure is detectable, and an upper network is stably held as much as possible.

However, since a time for expecting and waiting the operation of the lower layer is at least longer than a time until the lower layer actually detects the failure and recovers the failure, a certain degree of margin should be included. Accordingly, the failure detection time of the upper layer is set to be significantly longer than the shortest time for which an actual operation is possible.

On the other hand, as a network structure is complicated, it is necessary to provide a scheme of abstracting the network structure and comprehensively controlling an entire network.

As such a scheme, there has been considered a scheme using a technology such as GMPLS (Generalized Multi-Protocol Label Switching).

Particularly, in recent years, there has been considered a scheme of comprehensively and intensively controlling a network by a technology such as OpenFlow being standardized by ONF (Open Networking Foundation) which is an industrial organization. Since the version of the OpenFlow is continuously updated and a control range is expanded according to the version-up, network integration is also considered. Furthermore, cooperation control and the like of a communication failure recovery scheme are also expected in the future.

An example of the technology related to such GMPLS is disclosed in PTL 1. In PTL 1, it is pointed out that, when a failure occurs, a lower network of a multi-layer network can quickly take failure recovery measures such as setting a route for making a detour around the failure place, but that it is not possible to recognize execution situations of the failure recovery measures in such a lower network from a router. Therefore, the router needs to perform update of topology information and setting of a bypass route twice, that is, at the time of occurrence of failure and at the time of failure recovery in the lower network, resulting in an increase in a processing load.

Accordingly, in the technology disclosed in PTL 1, the router serving as an upper node does not update the topology information immediately at the time of the occurrence of the failure in the lower network but holds the update of the topology information for a predetermined time in expectation for a quick recovery of the lower network, thereby avoiding invalid route calculation.

CITATION LIST

Patent Literature

[PTL 1] Japanese Laid-Open Patent Application Publication No. 2003-258907

SUMMARY OF INVENTION

Technical Problem

As described above, in the general technology, on the basis of the assumption that a time required for failure detection and failure recovery becomes longer in an upper layer, the upper layer expects failure recovery in a lower layer and a time to wait while expecting an operation of the lower layer includes a certain degree of margin. For example, also in the technology disclosed in PTL 1, the upper node waits because it expects quick recovery of the lower network.

However, since a difference between communication distances in the upper layer and the lower layer is only a general tendency, this tendency does not match with all environments. For example, in a network in the building of a communication carrier, a difference between communication distances in the upper layer and the lower layer is not large.

Furthermore, since an operation time of a communication failure recovery method significantly depends on a processing load of a communication device, a mounting technology and the like, the lower layer is not always fast.

Therefore, it is not proper to uniformly apply a process, in which the upper layer waits while expecting the failure recovery of the lower layer, without considering environments and the like as with the general technology. For example, there is also a case in which it is proper to perform the failure recovery by using the functions of the upper layer without waiting the failure recovery of the lower layer.

That is, in the integrated network control as described above, it is necessary to select a function to be used from functions superposed to each layer.

In this regard, an object of the present invention is to provide a communication control device, a communication control system, a communication control method, and a communication control program, by which it is possible to select a function to be used from failure recovery functions superposed to each layer, such as communication failure recovery functions, in an integrated network control environment.

Solution to Problem

According to the first aspect of the invention, a communication control device that, when a communication failure occurs at a place in a first path for the communication that extends across a plurality of communication layers, selects a second path from a candidate group including one or more second paths for continuing communication without going via the place where the communication failure has occurred, based on required time with respect to each of the second paths for switching from the first path to the second path, and sends an instruction for switching from the first path to the selected second path and continuing communication to a communication device for performing the switching is provided.

According to the second aspect of the invention, a communication control system including a communication device that performs communication in at least a part of a plurality of communication layers and the communication control device, wherein the communication device is configured to continue communication by performing switching to a path selected by the communication control device, in response to the instruction from the communication control device is provided.

According to the third aspect of the invention, a communication control method performed by a communication control device, comprising the steps of: when a communication failure occurs at a place in a first path for communication that extends across a plurality of communication layers, selecting a second path from a candidate group including one or more second paths for continuing communication without going via the place where the communication failure has occurred, based on time required with respect to each of the second paths for switching from the first path to the second path; and sending an instruction for switching from the first path to the selected second path and continuing communication to a communication device for performing the switching is provided.

According to the fourth aspect of the invention, a communication control method performed by a communication control system including a communication device that performs communication in at least a part of a plurality of communication layers and a communication control device, wherein the communication control device performs the method described above, and the communication device having received an instruction from the communication control device continues communication by performing switching to a path selected by the communication control device, in response to the instruction is provided.

According to the fifth aspect of the invention, a communication control program causing a computer to serve as a communication control device that, when a communication failure occurs at a place in a first path for communication that extends across a plurality of communication layers, selects a second path from a candidate group including one or more second paths for continuing communication without going via the place where the communication failure has occurred, based on time required with respect to each of the second paths for switching from the first path to the second path, and sends an instruction for switching the first path to the selected second path and continuing communication to a communication device for performing the switching is provided.

Advantageous Effects of Invention

According to the present invention, it is possible to select a function to be used from failure recovery functions superposed to each layer, such as communication failure recovery functions, in an integrated network control environment.

BRIEF DESCRIPTION OF DRAWINGS

FIG. 4 is a diagram illustrating an example of a path database of a control device in an exemplary embodiment of the present invention.

FIG. 11 is a diagram illustrating an example of a format of a failure occurrence report notification from a communication device in an exemplary embodiment of the present invention.

FIG. 12 is a diagram illustrating a communication failure recovery time storage unit illustrated in FIG. 3 in an exemplary embodiment of the present invention and a detailed example of information stored in the communication failure recovery time storage unit.

FIG. 13 is a diagram illustrating an example of a format of a recovery execution instruction to a communication device from a control device in an exemplary embodiment of the present invention.

REFERENCE SIGNS LIST

Figure 1:
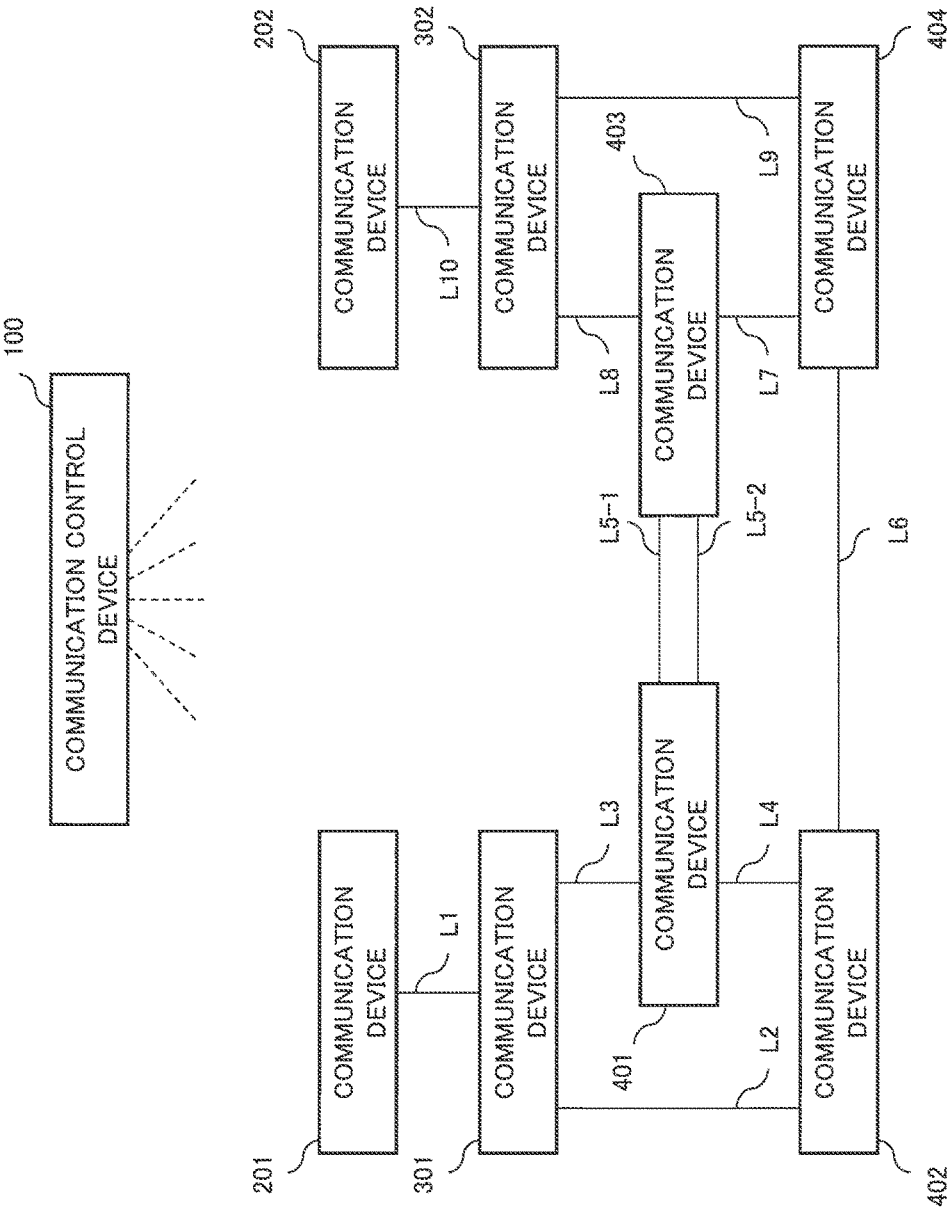
FIG. 1 is a diagram illustrating a basic configuration of an entire exemplary embodiment of the present invention.

100 communication control device
101 control unit
102 path database
103 path calculation unit
104 communication failure recovery time storage unit
105 communication failure recovery time estimation unit
106 communication failure recovery target calculation unit
107 input/output unit
201, 202, 301, 302, 401, 402, 403, 404 communication device

DESCRIPTION OF EMBODIMENTS

Firstly, an outline of an exemplary embodiment of the present invention will be described.

In the present exemplary embodiment, in integrated network control, when each of a plurality of layers has a communication failure recovery method, a communication failure recovery method to be used is selected from the communication failure recovery methods provided to the layers. Furthermore, in the present exemplary embodiment, any one is selected from candidates of a plurality of communication failure recovery methods.

In the present exemplary embodiment, an operation time of each communication failure recovery method is estimated, a communication failure recovery method is selected on the basis of the estimation, and a quick failure recovery time is achieved.

Moreover, in the present exemplary embodiment, failure recovery is performed for communication used by a user for a sufficiently quick time.

As an example of its means, the generation of retransmission timeout having a large influence on communication performance is suppressed in consideration of characteristics of communication conforming to TCP/IP (Transmission Control Protocol/Internet Protocol) generally and widely used.

More specifically, a time required for communication failure recovery is estimated for each of a plurality of communication failure recovery methods, a communication failure recovery method causing no retransmission timeout is selected on the basis of the estimation result, and a communication failure is recovered by the selected communication failure recovery method.

The above is the outline of the exemplary embodiment of the present invention.

Next, the exemplary embodiment of the present invention will be described in detail with reference to the accompanying drawings.

Firstly, the following description will be given with reference to FIG. 1 which is a diagram illustrating an entire configuration of a communication system which is the present exemplary embodiment. Referring to FIG. 1, the communication system according to the present exemplary embodiment includes a communication control device 100, a communication device 201, a communication device 202, a communication device 301, a communication device 302, a communication device 401, a communication device 402, a communication device 403, and a communication device 404.

Herein, in the following description, a group including the communication device 201, the communication device 202, the communication device 301, the communication device 302, the communication device 401, the communication device 402, the communication device 403, and the communication device 404 is called "each communication device group". Furthermore, when any one of each communication device group is called without particularly specifying, it is simply called a "communication device".

The aforementioned plurality of communication devices 201, 202, 301, 302, 401, 402, 403, and 404 included in the communication device group are connected to one another via links L1-L10. Furthermore, each of the plurality of communication devices included in the communication device group may also be a physical communication device or a virtual communication device. Similarly, each of the links L1-L10 may be either a physical line or a logical line, and a combination thereof.

Moreover, the communication control device 100 is connected to each of the communication devices included in the communication device group, and can control the respective communication devices by a control signal. As a control signal for performing control, a control signal conforming to OpenFlow may also be used, or a remote command corresponding to other communication devices may also be used. In addition, a connected communication line is not illustrated.

Herein, control of the communication device group by the communication control device 100 will be described in more detail.

Firstly, communication in a general network will be described as the assumption of the description. In the general network, each communication device (node) refers to a header of a packet inputted thereto, decides a transmission destination, and performs transmission to a next communication device.

For example, a communication device serving as a communication source makes an inquiry at a DNS (Domain Name System) server, thereby acquiring an IP address corresponding to URL of a communication device serving as a communication destination. Moreover, the communication device serving as the communication source stores information on an IP address and a MAC address of a communication source and an IP address of a communication destination in a request packet conforming to ARP (Address Resolution Protocol), and broadcasts the request packet to an Ethernet network. Each node having received the request packet transfers its own MAC address to the communication source when the IP address of the communication destination is the same as its own IP address. In this way, the communication device serving as the communication source acquires the MAC address of the communication destination.

The communication device serving as the communication source adds header information to information to be transmitted and then sends the information to the network. More specifically, the communication device serving as the communication source writes a port number corresponding to the communication device serving as the communication destination in a UDP header, a TCP header and the like corresponding to a transport layer which is a fourth layer, writes an IP address corresponding to the communication device serving as the communication destination in an IP header corresponding to a network layer which is a third layer, and writes a MAC address corresponding to the communication device serving as the communication destination in an Ethernet (a registered trademark) header corresponding to a data link layer which is a second layer.

Furthermore, a communication device included in the network selects a path by referring to each header, and transmits a packet to the communication device serving as the communication destination. For example, when the communication device is a router that performs a process in the third layer, the router reads the IP address, which is a destination, from the IP header. Furthermore, the communication device performs path control of collating the read IP address and a routing table created in conformity with a predetermined routing protocol, thereby deciding a transmission destination to which a packet is subsequently transmitted. Such a transmission scheme has characteristics that each communication device autonomously performs path control.

On the other hand, in the present exemplary embodiment, the communication control device intensively performs path control in transmission performed among the communication devices.

More specifically, when a failure has occurred in a specific path in the communication system, the communication control device 100 decides a path to be switched such that communication is quickly recovered. Then, in order to perform switching to the decided path, the communication control device 100 sends an instruction to a communication device for taking charge of the switching. In addition, the path is defined in a format of a path database illustrated in FIG. 4 as will be described later. The path will be simply described. The path is defined by a pair of nodes which are communication devices positioned at both ends of the path, a through node which is a communication device to be passed in the path, and a through link which is a link among these nodes. Unitary control by such a communication control device 100, for example, can be realized using an OpenFlow technology. In addition, the OpenFlow is only an example of a technology for realizing such unitary control, and such unitary control may also be realized using other technologies.

Figure 2:
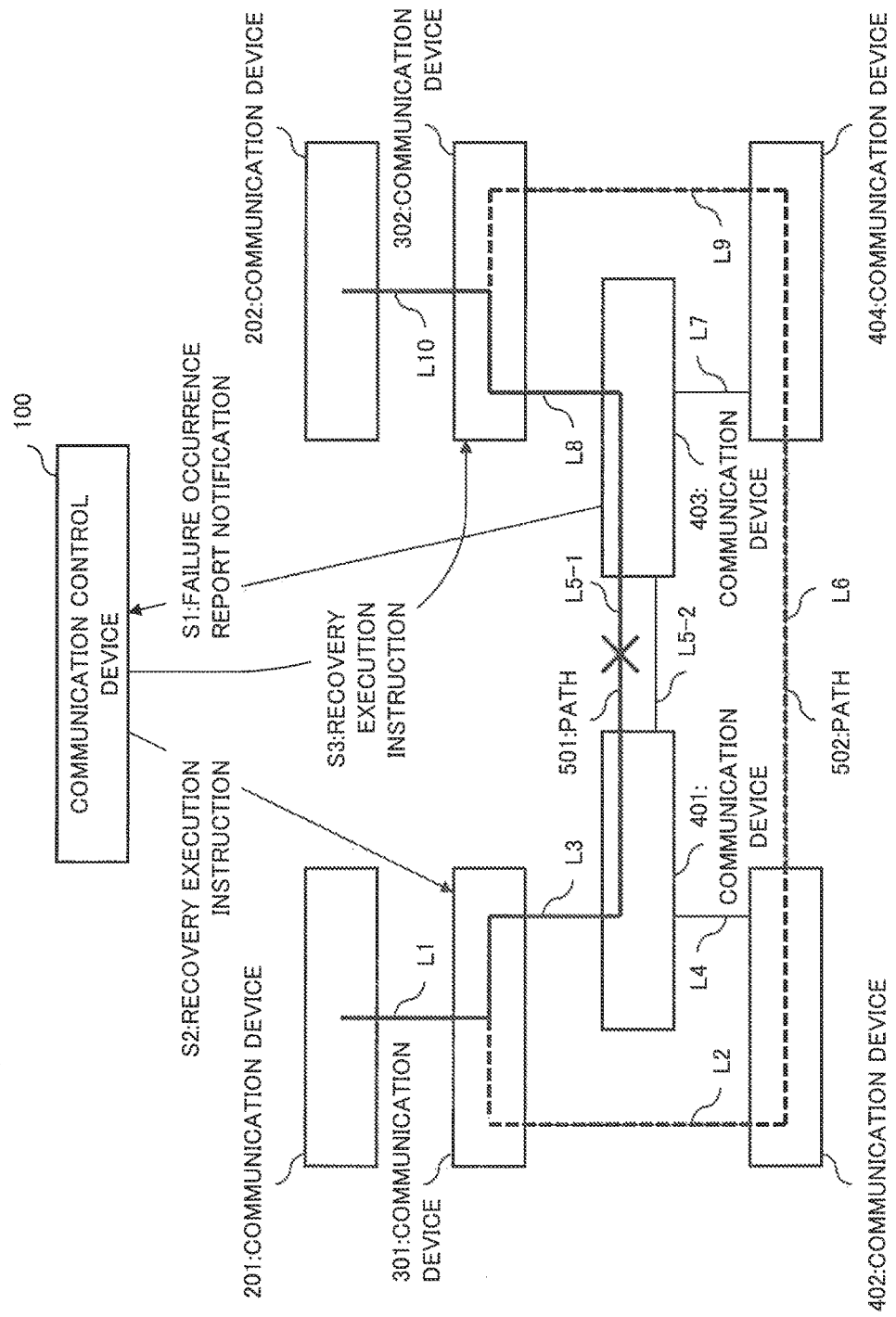
FIG. 2 is a diagram illustrating an outline of a control method according to an exemplary embodiment of the present invention.

Herein, communication failure detection under the unitary control by the communication control device 100 of the present exemplary embodiment will be described with reference to FIG. 2. In addition, the configuration of the entire communication system illustrated in FIG. 2 is assumed to be equal to the above-described configuration described with reference to FIG. 1.

In the present exemplary embodiment, when a communication failure has occurred in a network, a communication device having detected the communication failure notifies the communication control device 100 of the occurrence of the communication failure as a communication failure report notification.

In the present example, it is assumed that a failure has occurred in the link L5-1. Furthermore, it is assumed that the communication device 403 has detected the failure. In this way, the communication device 403 notifies the communication control device 100 of the fact that "the failure has occurred in the link L5-1". This notification is a failure occurrence report notification S1 in FIG. 2. Then, the communication control device 100 having received the failure occurrence report notification S1 estimates a required communication failure recovery time required when communication failure recovery has been performed by respective communication failure recovery methods available in the communication system. Herein, the estimation of the required communication failure recovery time is performed on the basis of both a time required for transferring an instruction of performing communication failure recovery methods from the communication control device 100 to a communication device that performs the communication failure recovery methods (that is, a communication device taking charge of path change) and a time required from the moment the communication device receives the instruction of performing communication failure recovery methods until the communication device performs path switching after receiving the instruction and the recovery from communication failure is completed.

Furthermore, for communication relying on the passage through, and therefore affected by, the failed link L5-1 (for example, communication performed along the path 501 including the failed link L5-1), a constraint time is also estimated as a constraint condition for preventing the communication failure recovery method from having a large impact on a user. Herein, the constraint time is a duration of time permissible as a required communication failure recovery time. The constraint time is determined, for example, in consideration of a timing of a data retransmission resulting from the communication failure, as to be a duration of time that ends earlier than the timing of the data retransmission.

In addition, more detailed estimation method of the required communication failure recovery time and estimation method of the constraint time will be described later.

Furthermore, on the basis of the aforementioned two types of estimation, a communication failure recovery method, in which the required communication failure recovery time satisfies the constraint time, is selected. Furthermore, the communication control device 100 sends an instruction to a communication device (that is, a communication device taking charge of path change) that performs the selected communication failure recovery method such that communication failure recovery is actually performed. In the following description, this instruction is called a "recovery execution instruction".

In the present example, the communication control device 100 transmits the recovery execution instruction to the communication device 301 and the communication device 302. The recovery execution instruction is a recovery execution instruction S2 and a recovery execution instruction S3 illustrated in FIG. 2.

The communication device 301 and the communication device 302 having received the recovery execution instruction from the communication control device 100 perform communication failure recovery operations. In the present example, the communication device 301 and the communication device 302 having received the instruction from the communication control device 100 perform the communication failure recovery operations by a communication failure recovery method for changing a communication path from the path 501 to a path 502, in cooperation with each other.

In this way, it is possible to achieve appropriate communication failure recovery while satisfying the constraint time.

Next, functional blocks included in the communication control device 100 according to the present invention will be described with reference to FIG. 3.

Figure 3:
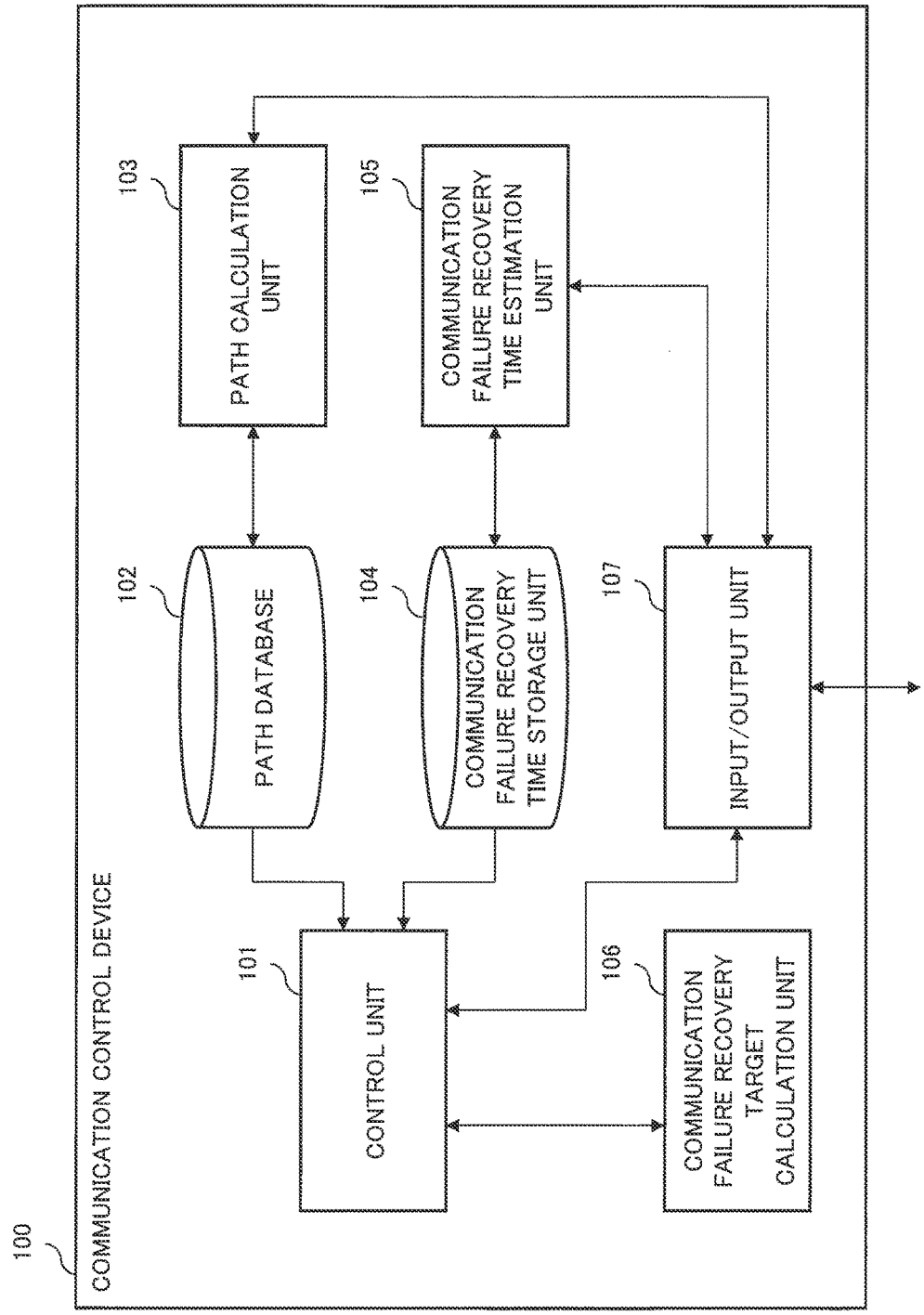
FIG. 3 is a diagram illustrating an outline of functional blocks included in a communication control device in an exemplary embodiment of the present invention.

Referring to FIG. 3, the communication control device 100 includes a control unit 101, an input/output unit 107, a path database 102, a communication failure recovery time storage unit 104, a communication failure recovery target calculation unit 106, a path calculation unit 103, and a communication failure recovery time estimation unit 105.

The control unit 101 identifies the content of a failure occurrence report notification received from the input/output unit 107. Then, the control unit 101 collates the identified content and information stored in the path database 102, thereby specifying a link of a path in which a failure has occurred. In more detail, the control unit 101 specifies a link, in which a failure has occurred, on the basis of information for identifying a through link included in the failure occurrence report notification.

In addition, the failure occurrence report notification corresponds to the failure occurrence report notification S1 in the example described with reference to FIG. 2.

Furthermore, the control unit 101 having received the failure occurrence report notification selects paths in which a failure recovery operation can be performed by referring to the information stored in the path database 102. That is, the control unit 101 selects alternative paths that can be used for the failure recovery operation. Then, the control unit 101 employs a set of all the selected paths as a candidate set of alternative paths. Furthermore, the control unit 101 having received the failure occurrence report notification inquires of the communication failure recovery target calculation unit 106 about the constraint time. Then, in relation to each alternative path included in the candidate set of the alternative paths, the control unit 101 inquires of the communication failure recovery time estimation unit 105 about the required communication failure recovery time which is a time required for changing a current path to the alternative path. Then, the control unit 101 selects and decides on an alternative path with a required communication failure recovery time equal to or less than the constraint time, from the candidate set.

Furthermore, the control unit 101 sends the recovery execution instruction to a communication device for changing the current path to the alternative path with a required communication failure recovery time equal to or less than the constraint time, via the input/output unit 107. For example, in the example described with reference to FIG. 2, the control unit 101 sends the recovery execution instruction to the communication device 301 and the communication device 302. This instruction corresponds to the recovery execution instruction S2 and the recovery execution instruction S3 of FIG. 2. The communication devices 301 and 302 having received these instructions S2 and S3 change the path 501 to the path 502 in cooperation with each other.

Herein, when there is more than one alternative path with a required communication failure recovery time equal to or less than the constraint time, the control unit 101, for example, selects the shortest alternative path with a required communication failure recovery time equal to or less than the constraint time. Furthermore, when there is no alternative path with a required communication failure recovery time equal to or less than the constraint time, the path may also be changed to an alternative path with a required communication failure recovery time not equal to nor less than the constraint time, or may also not be changed. When there is no change in the path, the failure recovery may also be performed by other methods.

The input/output unit 107 is a part having a function of performing communication with each communication device. The input/output unit 107 receives the failure occurrence report notification and inputs the received failure occurrence report notification to the control unit 101. Furthermore, the input/output unit 107 receives the recovery execution instruction from the control unit 101, and transmits the received recovery execution instruction to a communication device that performs path change for communication failure recovery.

The path database 102 is a database in which list information of paths included in the present exemplary embodiment is stored. The information stored in the path database 102 is illustrated in FIG. 4.

More specifically, as illustrated in FIG. 4, the information is stored in the path database 102 with respect to each path, wherein the information includes a pair of communication devices (indicated as "end points" of FIG. 4) serving as end portions of a path, a communication device (indicated as "a through node" of FIG. 4) passed in the path from one end point to the other end point, and a line (indicated as "a through link" of FIG. 4) passed along the path from the one end point to the other end point. The information is calculated in advance by the path calculation unit 103 before failure occurrence and is stored in the path database 102.

Herein, an example of paths included in the present exemplary embodiment will be described with reference to FIG. 5 to FIG. 7.

Figure 5:
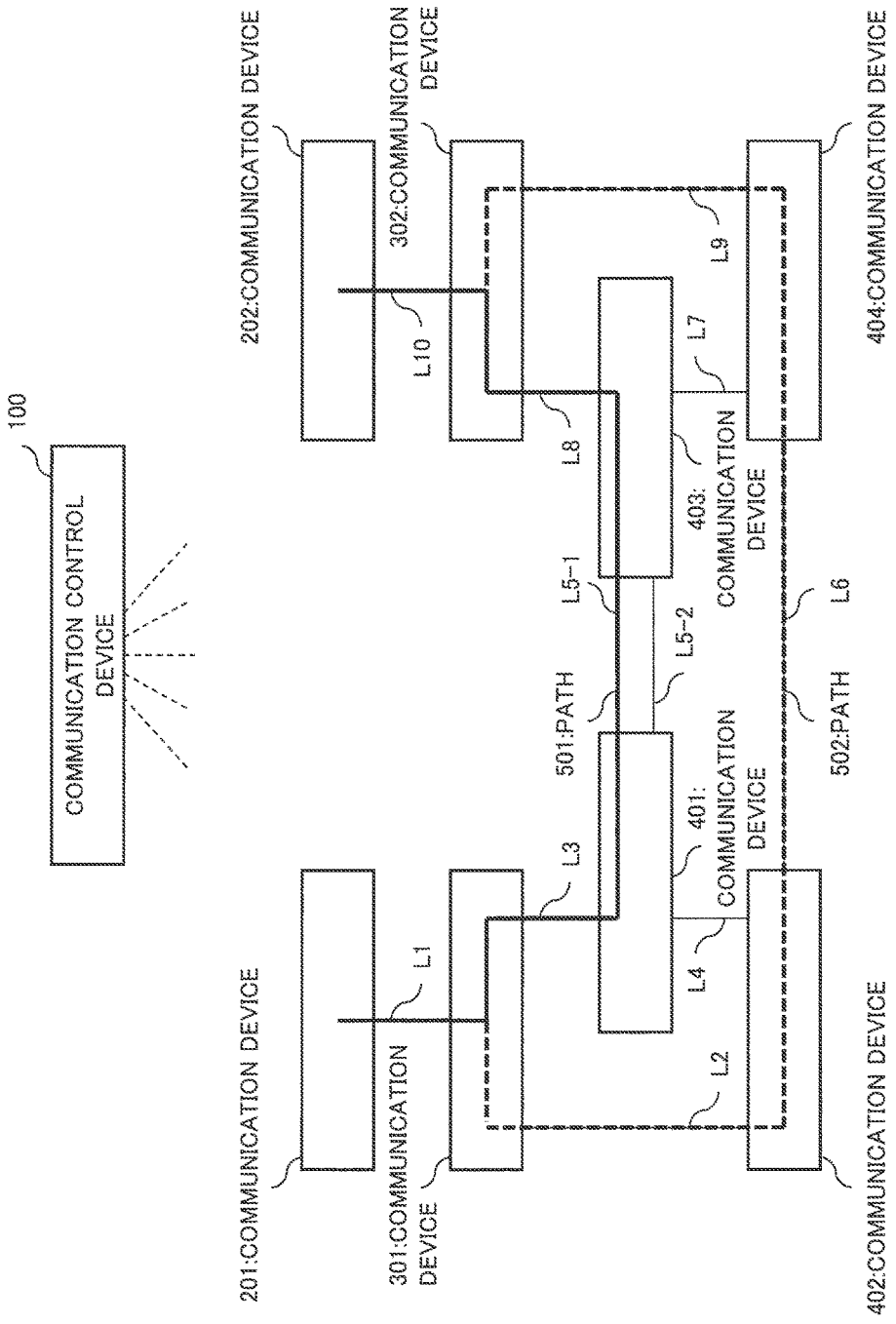
FIG. 5 is a diagram illustrating a path 501 in an exemplary embodiment of the present invention and a path 502 which is a candidate of communication failure recovery thereof.

Firstly, in FIG. 5, the path 501 and the path 502 are illustrated as an example.

These paths 501 and 502 are common in that the communication device 201 and the communication device 202, which are communication devices of the third layer, are employed as a pair of communication devices (that is, a pair of end points) positioned at both ends of the paths 501 and 502, and for example, when a failure has occurred in the path 501, the path 502 is one path included in the candidate set of the alternative paths.

For example, when a failure has occurred in the path 501, the path 502 has been described as one path included in the candidate set of the alternative paths. However, the candidate set of the alternative paths also further includes a path from the communication device 201 to the communication device 202 via the communication device 301, the communication device 401, the communication device 402, the communication device 404, the communication device 403, and the communication device 302.

In the example of FIG. 5, the candidate set of the alternative paths includes two alternative paths as described above, but one of these alternative paths, which satisfies a predetermined condition, is actually selected as an alternative path. Herein, the predetermined condition indicates that the required communication failure recovery time is equal to or less than the constraint time as described above.

The path 501 is a path employing communication devices serving as the end points of the path as the communication devices 201 and 202. Furthermore, in the path 501, communication devices existing along the path from the end point to the end point are communication devices 301, 401, 403, and 302. Moreover, lines included in the path 501 are lines L1, L3, L5-1, L8, and L10.

The path 502 is a path employing communication devices serving as the end points of the path as the communication devices 201 and 202. Furthermore, in the path 502, communication devices existing along the path from the end point to the end point are communication devices 301, 402, 404, and 302. Moreover, lines included in the path 502 are lines L1, L2, L6, L9, and L10.

Figure 6:
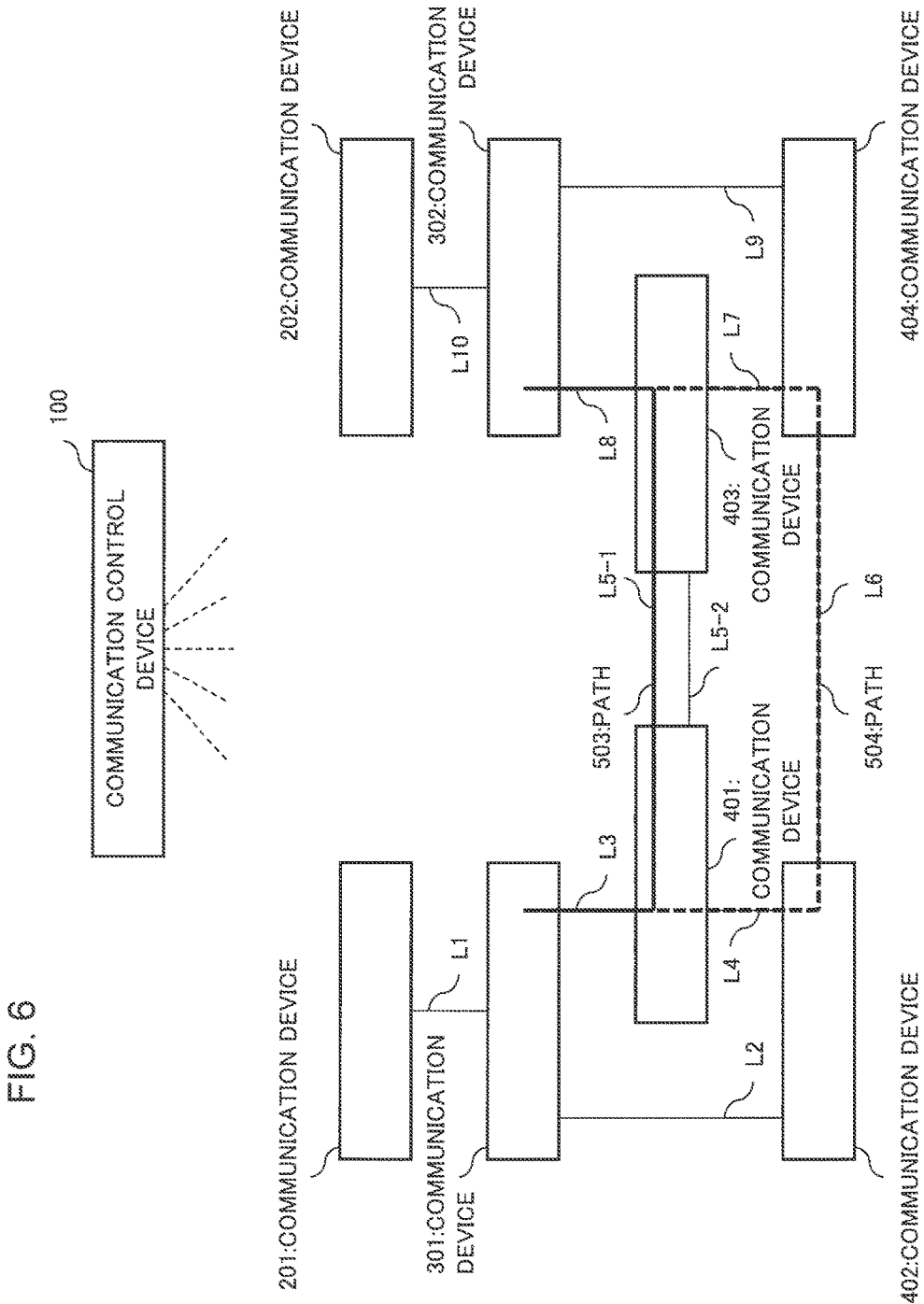
FIG. 6 is a diagram illustrating a path 503 and a path 504 in an exemplary embodiment of the present invention.

Furthermore, in FIG. 6, a path 503 and a path 504 are illustrated as an example.

In FIG. 6, a path 503 and a path 504 are illustrated as an example.

These paths 503 and 504 are common in that the communication device 301 and the communication device 302, which are communication devices across the second layer/the third layer, are employed as a pair of communication devices (that is, a pair of end points) positioned at both ends of the paths 503 and 504, and for example, when a failure has occurred in the path 503, the path 504 is one path included in the candidate set of the alternative paths.

For example, when a failure has occurred in the path 503, the path 504 has been described as one path included in the candidate set of the alternative paths. However, the candidate set of the alternative paths also further includes a path from the communication device 301 to the communication device 302 via the communication device 402 and the communication device 404.

In the example of FIG. 6, the candidate set of the alternative paths includes two alternative paths as described above, but one of these alternative paths, which satisfies a predetermined condition, is actually selected as an alternative path. Herein, the predetermined condition is that the required communication failure recovery time is equal to or less than the constraint time as described above.

The path 503 is a path employing communication devices serving as the end points of the path as the communication devices 301 and 302. Furthermore, in the path 503, communication devices existing along the path from the end point to the end point are communication devices 401 and 403. Moreover, lines included in the path 503 are lines L3, L5-1, and L8.

The path 504 is a path employing communication devices serving as the end points of the path as the communication devices 301 and 302. Furthermore, in the path 504, communication devices existing along the path from the end point to the end point are communication devices 401, 402, 404, and 403. Moreover, lines included in the path 504 are lines L3, L4, L6, L7, and L8.

Figure 7:
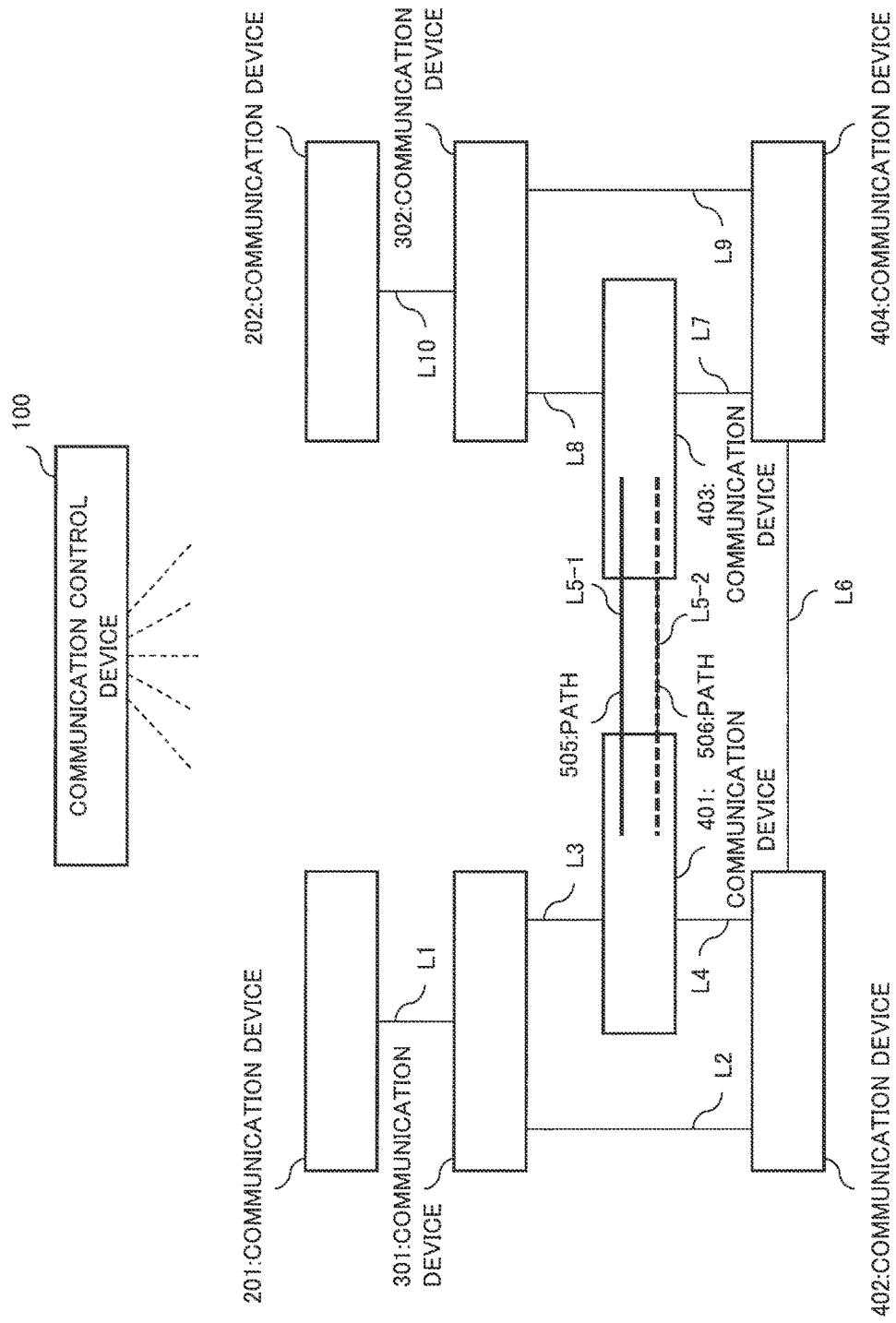
FIG. 7 is a diagram illustrating a path 505 and a path 506 in an exemplary embodiment of the present invention.

In FIG. 7, a path 505 and a path 506 are illustrated as an example.

These paths 505 and 506 are common in that the communication device 401 and the communication device 403, which are communication devices of the second layer, are employed as a pair of communication devices (that is, a pair of end points) positioned at both ends of the paths 505 and 506, and for example, when a failure has occurred in the path 505, the path 506 is one path included in the candidate set of the alternative paths.

For example, when a failure has occurred in the path 505, the path 506 has been described as one path included in the candidate set of the alternative paths. However, the candidate set of the alternative paths also further includes a path from the communication device 401 to the communication device 403 via the communication device 402 and the communication device 404.

In the example of FIG. 7, the candidate set of the alternative paths includes two alternative paths as described above, but one of these alternative paths, which satisfies a predetermined condition, is actually selected as an alternative path. Herein, the predetermined condition is that the required communication failure recovery time is equal to or less than the constraint time as described above.

The path 505 is a path employing communication devices serving as the end points of the path as the communication devices 401 and 403. Furthermore, in the path 505, there are no communication devices passed between one of the end points and another end point. Moreover, a line passed between one of the end points and another end point in the path 505 is the link L5-1.

The path 506 is a path employing communication devices serving as the end points of the path as the communication devices 401 and 403. Furthermore, in the path 506, there are no communication devices passed between one of the end points and another end point. Moreover, a line passed between one of the end points and other end point in the path 506 is a link L5-2.

The path calculation unit 103 is a part that calculates a maximum number of paths which can be found between the end points and stores the paths in the path database 102. There is no particular limitation in the calculation method, and a general calculation method is available.

For example, when the present exemplary embodiment is a calculation method of paths when conforming to Open-Flow, a PacketOut message indicating "output of a specified packet is instructed" is transmitted to each communication device from the path calculation unit 103. In response to this, each communication device sends a LLDP (Link Layer Discovery Protocol) packet to all communication devices connected thereto. Adjacent communication devices having received the LLDP packet transmit data to the path calculation unit 103 of the communication control device 100, the data indicating a "port through which the LLDP packet has been received from any communication device". The path calculation unit 103 catches a path on the basis of the data and calculates information on the paths stored in the path database 102.

In addition, the calculation operation by the path calculation unit 103 may also be regularly repeated. In this way, latest information is stored in the path database 102.

Furthermore, the path calculation unit 103 may also calculate an alternative path which employs communication devices at both ends of a path pertaining to a failure as communication devices of both ends, whenever a failure occurs. Whether the communication control device 100 calculates paths in advance with respect to communication devices, which perform path change, and stores the paths in the path database 102 or calculates only a required alternative path whenever a failure occurs can be selected in consideration of various factors such as a required calculation number, a calculation time, and required storage capacity.

The communication failure recovery time estimation unit 105 is a part that estimates a time until a communication failure recovery method starts to be performed, a failure is recovered, and the method is ended, and stores the estimation result in the communication failure recovery time storage unit 104. The communication failure recovery time estimation unit 105 estimates a time until a communication failure recovery method starts to be performed for each of the paths stored in the path database 102, a failure is recovered, and the method is ended. A detailed estimation method of the time by the communication failure recovery time estimation unit 105 will be described later.

The communication failure recovery time storage unit 104 is a database that stores the time estimated by the communication failure recovery time estimation unit 105.

The communication failure recovery target calculation unit 106 sets a constraint time CT, which is a constraint time, with respect to communication performed in a path passing through a failure place.

More specifically, in the present exemplary embodiment, since it is assumed that communication conforming to TCP/IP is performed, a packet reciprocating time (RTT: Round Trip Time) of the TCP/IP is estimated and the constraint time CT is set so as to satisfy a relation of RTT>CT.

This point will be described with reference to FIG. 8.

Figure 8:
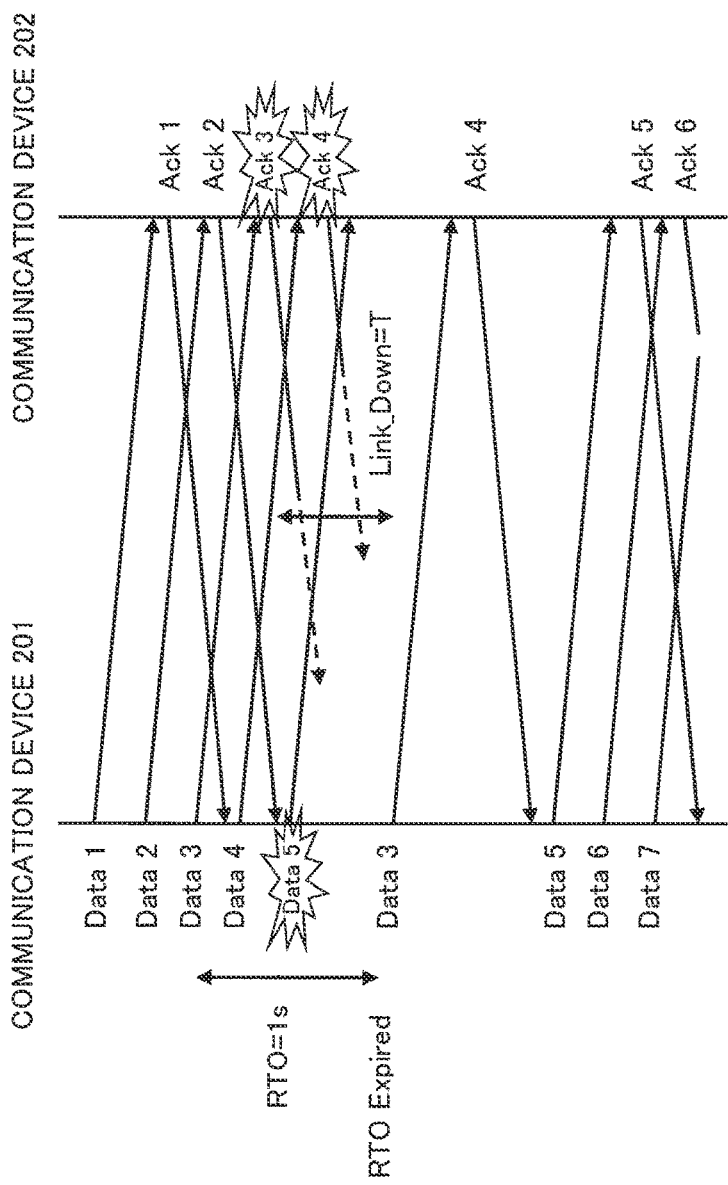
FIG. 8 is a diagram illustrating transmission/reception of data and an acknowledgement in TCP/IP communication.
Figure 9:
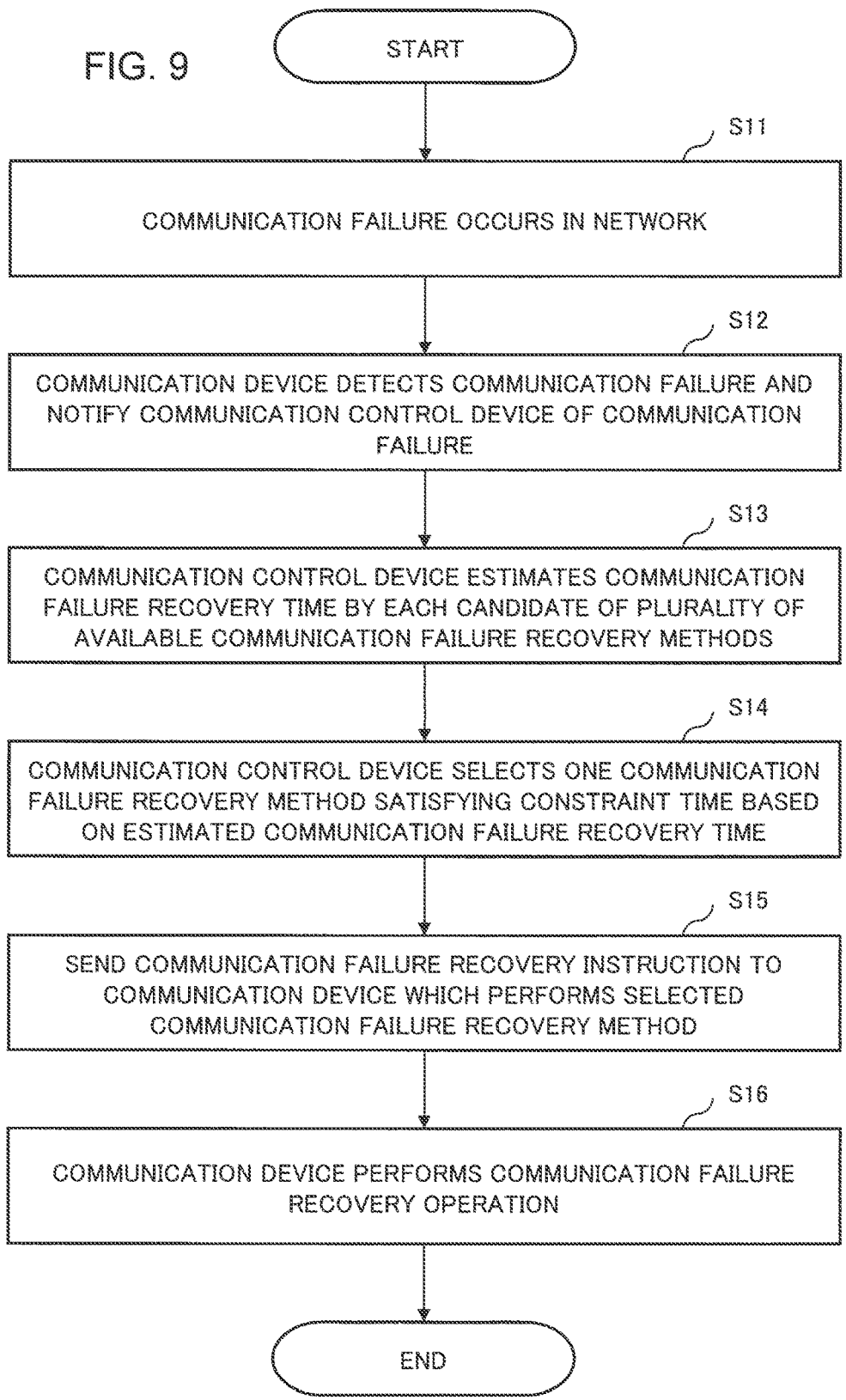
FIG. 9 is a flowchart illustrating an outline of a control method of a communication failure recovery method according to the present invention.

In the TCP, communication is performed using data (DATA) and an acknowledgement (ACK), which is a reply indicating the reception of the data, as illustrated in FIG. 8.

When a communication line is not available longer time than the RTT, the transmission of a packet is stopped in many cases, and in order to restart this, it is typically necessary to wait until a retransmission timer of one second starts to operate. In the illustrated example, the transmission of DATA 5 to be transmitted by the communication device 201 and Ack3 and Ack4 to be transmitted by a communication device are stopped. Furthermore, since the communication device 201 receives no Ack3, it is necessary to perform retransmission from the already transmitted DATA3.

As described above, when the communication line longer than the RTT is not available, a long standby time occurs. In addition, when the retransmission timer has started to operate, a communication speed is reduced to a minimum. When the communication line longer than the RTT is not available due to the two factors of the occurrence of the standby time and the reduction of the communication speed, communication performance is considerably reduced.

In this regard, in order to estimate a constraint time such that communication affected by a failure is not largely affected, it is assumed in the present exemplary embodiment that TCP/IP communication is performed in each path, and a time shorter than the RTT of a path is set as a constraint time of a communication failure recovery target time such that retransmission timeout causing large communication performance reduction in the TCP/IP communication is not started to operate. Then, a path, which can be changed in a time equal to or less than a constraint time shorter than the RTT, is selected.

In addition, in order to measure or estimate reciprocating delay of a path, an OAM (Operation Administration and Management) function is used or a PING function of a control unit of each communication device is used. Furthermore, for example, when the present exemplary embodiment conforms to OpenFlow, a Packet Out, which is a message for transmitting a packet from a designated port of a communication device, is applied with one of the messages defined in the OpenFlow, so that it is possible to measure the reciprocating delay.

So far, each functional block included in the communication control device 100 has been described. The communication control device 100 including these functional blocks may also be realized by a computer unique to the present exemplary embodiment, or may also be realized by a general purpose server apparatus, a general purpose personal computer and the like. Furthermore, an operation processing device included in these computers performs operation processing based on a program unique to the present exemplary embodiment and controls each hardware of the computer in response to the operation result, so that each function block illustrated in FIG. 3 may also be realized.

On the other hand, since each communication device included in the present exemplary embodiment, for example, can be realized by a general purpose equipment widely known to those who skilled in the art, which is generally referred to as an OpenFlow switch, a description of a detailed configuration of each communication device will be omitted.

Subsequently, an operation of the present exemplary embodiment will be described with reference to a flowchart of FIG. 9, FIG. 10 to FIG. 13 and the like. In the present description, it is assumed that the communication device 201 and the communication device 202 communicate with each other by using TCP/IP. Furthermore, in the present description, it is assumed that the communication device 301 and the communication device 302 are MPLS switches and the communication device 401 to the communication device 404 are Ethernet switches. This is only an example for a description, and the present exemplary embodiment can also be realized in other types of communication devices and switches.

Figure 10:
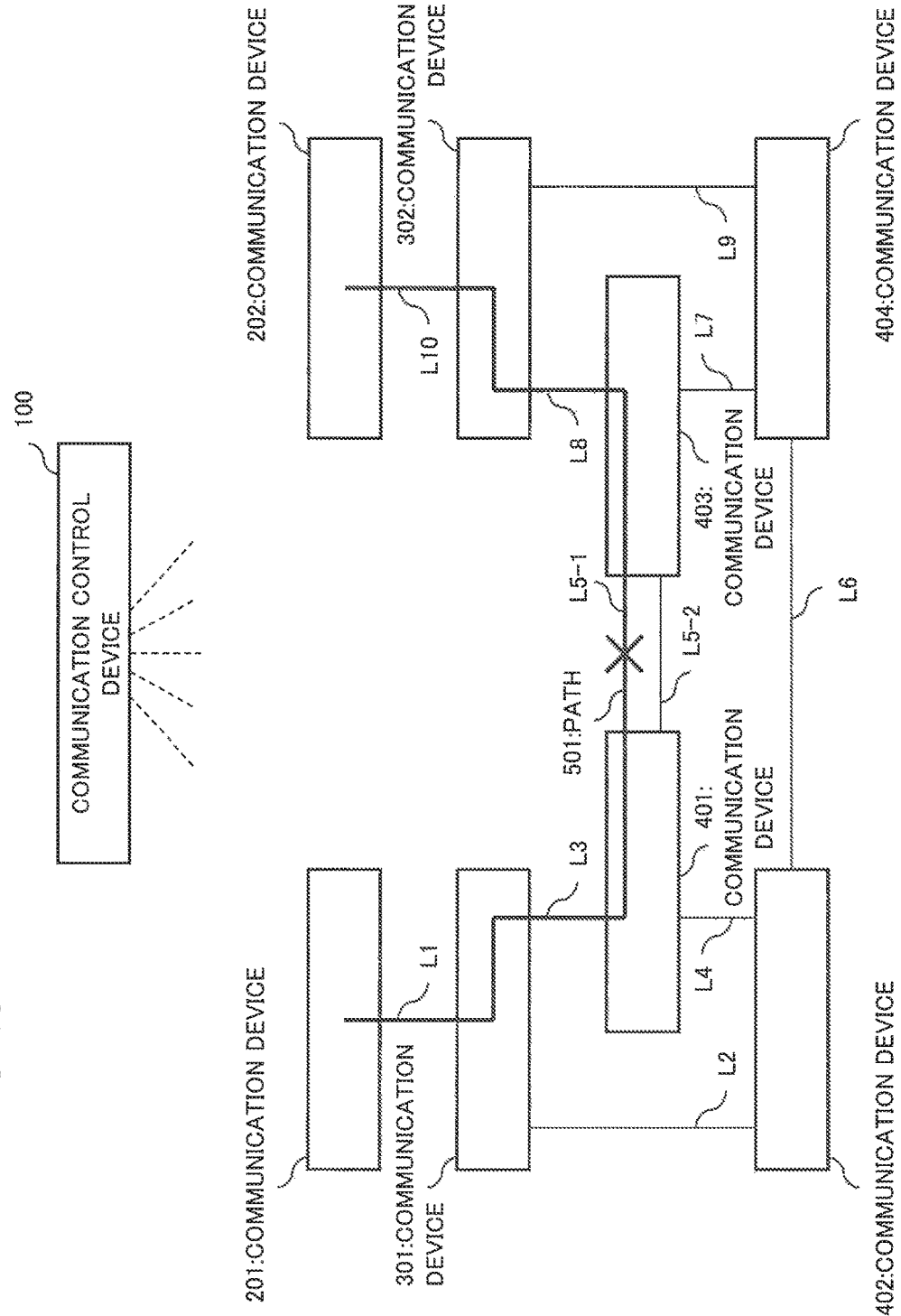
FIG. 10 is a diagram illustrating a situation in which a failure has occurred in a link L5-1 included in a path 501 in an exemplary embodiment of the present invention.

Firstly, it is assumed that the communication device 201 and the communication device 202 communicate with each other via the path 501 as illustrated in FIG. 10. It is assumed that during this communication, a communication failure has occurred in the link L5-1 by any factors (step S11).

Then, a communication device detects the communication failure and outputs a failure occurrence report notification to the communication control device 100. In the present description example, the communication device 403 (an Ethernet switch) detects the communication failure and outputs a failure occurrence report notification to the communication control device 100 (step S12).

Herein, FIG. 11 illustrates a detailed example of a failure occurrence report notification from a communication device in which a communication failure has occurred. The failure occurrence report notification stores a signal ID indicating that the communication failure has occurred, a node ID indicating a communication device (a node) serving as a transmission source having transmitted the notification, and a failure place ID for specifying a failure place.

Herein, as the failure place ID for specifying the failure place, for example, it is considered to use any one of a line ID, a logical line ID, and a flow ID.

Firstly, the line ID is an ID assigned to each link and is assigned regardless of a layer to which each link belongs. In the case of using the line ID, it is assumed that the line ID is assigned at the time of system construction and at the time of new connection among communication devices and the communication control device 100 notifies each communication device of the line ID, so that links can be distinguished from one another. Then, the communication control device 100 notifies each communication device of a line ID, which corresponds to a link in which a failure has occurred, as the failure place ID. In this way, the communication device 100 can specify a place where the failure has occurred.

Furthermore, in the present exemplary embodiment, the logical line ID and the flow ID may also be used without using the line ID as described above.

Herein, the logical line ID is an ID for logically specifying any link by specifying a transmission source of a packet and a frame, and a transmission destination connected to the transmission source via any link. A detailed content of the logical line ID differs according to a layer to which a failed link belongs.

For example, when the failed link belongs to the third layer, an IP communication device, which is a notification source communication device of a failure occurrence report notification, uses the logical line ID and an IP address (a set of a source and a destination). Furthermore, a logical line corresponds between an IP address, to which a packet with the IP address is outputted, and an IP address of an IP communication device (a Next Hop) serving as a transmission destination of the packet.

Furthermore, when the failed link belongs to the second/third layer, a MPLS communication device (a notification source communication device of a failure occurrence report notification) uses a MPLS label as the logical line ID. Furthermore, a logical line corresponds between a line, to which a frame with the label is outputted, and a line of the MPLS communication device serving as a transmission destination of the frame.

Moreover, when the failed link belongs to the second layer, an Ethernet communication device which is a notification source communication device of a failure occurrence report notification, uses a MAC address (a set of a source and a destination) as the logical line ID. Furthermore, a logical line corresponds between a line, to which a frame with the address is outputted, and a line of the Ethernet communication device serving as a transmission destination of the frame.

On the other hand, a link may also be specified by a flow ID for identifying flows used in the OpenFlow and the like. Herein, the flows used in the OpenFlow and the like correspond to information including arbitrary addresses and identifiers of each layer, and it is possible to specify a corresponding link by identifying the flows from one another.

In addition, in the case of using the logical line ID and the flow ID, the line ID may not also be used. Therefore, in this case, a process for assigning the line ID to each link or a process for managing the line ID may not also be performed. This is because it is possible to specify links by the logical line ID or the flow ID instead of the line ID.

The control unit 101 having received a failure occurrence report notification specifies a path in which a failure has occurred, and specifies a path including a place in which the failure has occurred with reference to the path database 102 when deciding a candidate set of paths in which the failure can be recovered. This is a path including a failure place written in the notification illustrated in FIG. 11. For example, it is possible to determine whether a failure has occurred in the paths 501, 503, and 505 including the link L5-1 with reference to a failure occurrence report notification indicating that the link L5-1 is a failure. Furthermore, it is possible to determine that communication failure recovery is possible by switching the path to any one of the paths 502, 504, and 506, which are paths having end points equal to those of each path as end points or through nodes and not including link L5-1. For example, FIG. 5 illustrates the path 502, which has end points equal to those of the communication path 501 and passes through the communication device 301 and the communication device 302, which are MPLS switches, as another path.

Furthermore, in the present exemplary embodiment, a time required when communication failure recovery has been performed by switching a path from the first path to the second path is estimated and this estimation time is stored in the communication failure recovery time storage unit 104 as with the example of FIG. 12 (step S13), wherein the first path and the second path have the same end points.

Herein, an estimation time T "T (the first path, the second path)" for achieving communication failure recovery by switching the first path and the second path, which are paths used in communication and have the same end points, is calculated on the basis of the following Equation 1.
[formula 1]

$$T(\text{the first path, the second path}) = \max(P1, P2) + M + S \quad \text{Equation (1)}$$

In Equation 1 above, P1 denotes a signal transfer time to a first communication device receiving a path switching instruction from the communication control device 100, P2 denotes a signal transfer time to a second communication device receiving the path switching instruction from the communication control device 100, M denotes a time required for setting an alternative path in a communication device, and S denotes a time required for switching a path from the failed path to the set alternative path.

Herein, in Equation 1 above, P1 and P2, for example, can be measured using Ping and the like. In a detailed example, an "echo request" packet of ICMP (Internet Control Message Protocol) is transmitted from the communication control device 100 to a communication device receiving the path switching instruction. Then, a time until an "echo reply" is returned from the communication device serving as a transmission destination after the transmission time is measured, so that it is possible to confirm reachability and measure the signal transfer time.

Furthermore, in Equation 1 above, since M is a time required for setting the alternative path, M is assumed to 0 when the alternative path has been prepared in advance.

Moreover, in Equation 1 above, M and S can be calculated by actually switching a path and actually measuring a required time when no failure has occurred and the like. Furthermore, instead of actual measurement, values corresponding to the types of communication devices may be stored and the stored values may also be used in response to the types of the communication devices. For example, values, such as a second in the case of an Ethernet switch and b second in the case of a MPLS switch, may be stored in response to the types of communication devices, and the stored values may also be used in response to the types of communication devices taking charge of a path change of a path for which an estimation time is calculated this time.

Furthermore, in consideration of the fact that functions, setting and the like of the communication devices may be different from one another even though the types of the communication devices are equal to one another, actually measured values may be stored in advance for the communication devices instead of the types of the communication devices, and the stored values corresponding to the communication devices may also be used. For example, even in the case of the same Ethernet switches, for example, c second may be stored for the communication device 401, d second may be stored for the communication device 402, and the stored values corresponding to the communication devices may also be used.

Moreover, the estimation time T may also be initially estimated at the time of failure occurrence. However, the estimation time T may be estimated in advance for each path before failure occurrence, may be stored in the communication failure recovery time storage unit 104, and may also be read according to necessity.

Firstly, in the example of FIG. 5, a time T required for changing the path 501 to the alternative path 502 is estimated. Herein, the path 501 and the path 502 are paths which employ their end points as the communication device 201 and the communication device 202 communicating with each other by using TCP/IP. In the present example, it is assumed that P1=0.1, P2=0.2, M=0.1, and S=0.2 in Equation 1 above. Then, on the basis of Equation 1 above, the communication failure recovery time estimation unit 105 estimates that T (the path 501, the path 502)=max(0.1, 0.2)+0.1=0.2=0.5 second.

Since the estimation of the time T required for changing the path 501 to another alternative path is the same as the aforementioned estimation, a description thereof will be omitted. However, numeral values generally differ.

Next, in the example of FIG. 6, a time T required for changing the path 503 to the alternative path 504 is estimated. Herein, the path 503 and the path 504 are paths which employ their end points as the communication device 301 and the communication device 302 which are MPLS switches, and pass through the communication device 401 and the communication device 403 which are Ethernet switches.

In the Ethernet, network reconstruction conforming to a rapid spanning tree protocol (RSTP) is required at the time of path switching. Therefore, a path switching time becomes long. That is, since the communication devices 401 and 402 (Ethernet switches) change a transmission destination path to achieve a path change, a path switching time becomes long.

Therefore, as compared with the case in which the communication device 201 and the communication device 202 communicating with each other by using TCP/IP are employed as communication devices at both ends and the path 501 is changed to the path 502 by a transmission destination path change in the communication devices 301 and 302 (MPLS switches) as illustrated in FIG. 5, the values of M and S become large in Equation 1 above in the case as illustrated in FIG. 6. In the present example of FIG. 6, it is assumed that P1=0.1, P2=0.2, M=0.8, and S=1 in Equation 1 above. Then, on the basis of Equation 1 above, the communication failure recovery time estimation unit 105 estimates that T (the path 503 and the path 504)=max(0.1, 0.2)+0.8=1=2 seconds.

For reference, returning to the example of FIG. 5, a path from the communication device 201 to the communication device 202 via the communication device 301, the communication device 401, the communication device 402, the communication device 404, the communication device 403, and the communication device 302 is also included as an alternative path in addition to the path 502. However, in order to change the path 501 to such a path, it is necessary to perform a path change by a change in a transmission destination path by the communication devices 401 and 402 (Ethernet switches). A time for such a change becomes relatively long as described above. Accordingly, a change to the path 502 as illustrated in FIG. 5 is normally selected instead of such a change.

In the present exemplary embodiment, determination based on the time T, which is required for changing the path to the alternative path and has been estimated on the basis of Equation 1 above, is performed. Therefore, it may be possible to perform selection for changing the path 501 to a path from the communication device 201 to the communication device 202 via the communication device 301, the communication device 401, the communication device 402, the communication device 404, the communication device 403, and the communication device 302 by switching in the communication devices 401 and 402, which are Ethernet switches. As described above, the present exemplary embodiment has characteristics that a path is not changed in the same way on the basis of general characteristics of each layer, the time T is estimated, and a path to be changed is selected on the basis of the estimated time T regardless of the types of layers. Accordingly, a layer, to which a communication device performing switching for a path change belongs, depends on a path before being changed and an alternative path. Furthermore, when the path before being changed and the alternative path have been compared with each other, one or more layers, to which a path with a difference between these paths belongs, also depend on the path before being changed and the alternative path. Moreover, when the path before being changed and the alternative path have been compared with each other, one or more layers, to which a path with a difference between these paths belongs, are layers below a layer to which a communication device performing switching for a path change belongs.

Next, in the example of FIG. 7, a time T required for changing the path 505 to the alternative path 506 is estimated. Herein, the path 505 and the path 506 are paths which employ the communication devices 401 and 402, which are Ethernet switches, as communication devices of both ends thereof. It is assumed that in the path 505 and the path 506, a plurality of physical links are converged and are treated as one logical link, resulting in the achievement of a link aggregation which is a technology for achieving high speed communication. Therefore, in path switching from the path 505 to the alternative path 506, network reconstruction conforming to a rapid spanning tree protocol when the path 503 is changed to the alternative path 504 is not required. Therefore, the values of both M and S in Equation 1 above become zero. More specifically, in the present example, it is assumed that P1=0.1, P2=0.2, M=0, and S=0 in Equation 1 above. Then, on the basis of Equation 1 above, the communication failure recovery time estimation unit 105 estimates that T (the path 505, the path 506)=max(0.1, 0.2)=0.2 second.

Then, the communication failure recovery time estimation unit 105 stores the estimation result in the communication failure recovery time storage unit 104 as illustrated in FIG. 12.

Next, the communication control device 100 selects a communication failure recovery method in which the estimated communication failure recovery time is equal to or less than the constraint time (step S14). Herein, as described above, when there is more than one alternative path with a required communication failure recovery time equal to or less than the constraint time, the communication control device 100, for example, selects the shortest alternative path with a required communication failure recovery time equal to or less than the constraint time. Furthermore, when there is no alternative path with a required communication failure recovery time equal to or less than the constraint time, the path may also be changed to an alternative path with a required communication failure recovery time not equal to nor less than the constraint time, or may also not be changed. When there is no change in the path, the failure recovery may also be performed by other methods.

Therefore, firstly, the control unit 101 inquires the constraint time CT set in the communication failure recovery target calculation unit 106. Furthermore, the control unit 101 acquires the estimation time T for each of the path candidates with reference to the communication failure recovery time storage unit 104.

Then, the control unit 101 selects a path satisfying a relation of CT≥T.

This time, T for each path is as follows.

T (the path 501, the path 502)=0.5 second, T (the path 503, the path 504)=2 seconds, and T (the path 505, the path 506)=0.2 second.

Furthermore, if CT=0.3 second, path switching to the alternative path 506 from the path 505, which satisfies the relation of CT≥T, is selected as a communication failure recovery method to be performed. In addition, when there is more than one path satisfying the relation of CT≥T, one of the paths is selected. The selection criterion can be arbitrarily decided, but for example, an alternative path with the shortest estimation time T may also be selected or the shortest alternative path may also be selected. In addition to this, for example, as a communication device taking charge of a change, a predetermined communication device (for example, a MPLS switch) may also be preferentially selected, or an alternative path to be preferentially selected may also be decided in advance.

Furthermore, it may also be applied in a business case such that costs are calculated in advance for paths which may be alternative paths and a path with the lowest cost is selected from among candidates of the paths satisfying the relation of CT≥T.

In addition, a score may also be calculated using a function including costs and the round trip time (RTT) delay and the alternative path may also be decided based on the score.

In this case, for example, the score is considered to be a path cost*RTT. Herein, since the path cost is the sum of line costs, the score is calculated as the sum of the line costs*RTT.

In addition, when there are no candidates of the paths satisfying the relation of CT≥T, a path, in which T is nearest to CT, or a path, in which an actual cost is the lowest, may also be selected.

Next, the control unit 101 sends a failure recovery execution instruction to a communication device which performs the selected communication failure recovery method (step S15). Herein, a detailed example of the failure recovery execution instruction transmitted to the communication device from the communication control device 100 is illustrated in FIG. 13. The instruction includes a signal ID indicating that the communication failure recovery method is performed, a node ID indicating a communication device (that is, a communication device performing a path change operation) serving as a notification destination, transmission setting which is setting for transmission of a path change, information indicating a filter condition for narrowing transmission objects related to an alternative path by the path change, and information indicating an output destination related to the alternative path by the path change.

As the filter condition, it is possible to use an input line ID which is a line ID for specifying a link receiving input, and an input logical line ID which is a logical line ID for specifying a link receiving input. In addition, as the filter condition, information regarding whether a packet is an object receiving input may also be put into an arbitrary place of the packet (corresponding to an arbitrary place of the packet of FIG. 13).

Moreover, as the information indicating an output destination, it is possible to use an output line ID which is a line ID for specifying a link of the output destination, and an output logical line ID which is a logical line ID for specifying the link of the output destination. In addition, an "output destination" for specifying a communication device serving as an output destination may also be used as the information indicating an output destination. The output destination is an IP address corresponding to an IP communication device when a communication device serving as an output destination is the IP communication device, is a MPLS label corresponding to a MPLS communication device when the communication device serving as an output destination is the MPLS communication device, and is a MAC address corresponding to an Ethernet communication device when the communication device serving as an output destination is the Ethernet communication device.

In addition, the line ID and the logical line ID used in FIG. 13 and the description of FIG. 13 are the same as the line ID and the logical line ID used in FIG. 11 and the description of FIG. 11.

The communication device having received the failure recovery execution instruction performs a communication failure recovery operation (step S16). In this way, the communication failure recovery operation is performed within the range of the constraint time, thereby obtaining an effect that it is possible to recover a communication failure without having a large influence on communication.

In addition, the aforementioned each communication control device can be implemented by hardware, software, or a combination thereof. Furthermore, a communication failure recovery method performed by the aforementioned communication control device can also be implemented by hardware, software, or a combination thereof. Herein, the implementation by the software indicates implementation through the read and execution of a program by a computer.

The program can be stored using various types of non-transitory computer readable media, and can be supplied to a computer. The non-transitory computer readable media include various types of tangible storage media. An example of the non-transitory computer readable medium includes a magnetic storage medium (for example, a flexible disk, a magnetic tape, and a hard disk drive), a magneto-optical storage medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (Random Access Memory). Furthermore, the program may also be supplied to a computer by various types of transitory computer readable media. Examples of the transitory computer readable medium include an electrical signal, an optical signal, and an electromagnetic wave. The transitory computer readable medium can supply the program to a computer via a wired communication path such as an electric wire and an optical fiber, or a wireless communication path.

Furthermore, the above-described exemplary embodiment is a preferred exemplary embodiment of the present invention, but the scope of the present invention is not limited only to the aforementioned exemplary embodiment and various changes can be made in the aforementioned exemplary embodiment without departing from the scope of the present invention. For example, in the present exemplary embodiment, as an estimation method of a communication failure recovery time and a decision method of a constraint time, methods different from the above-described methods can also be used.

The problems solved by the above-described exemplary embodiment, the methods for solving the problems, and effects thereof are as follows.

The first problem solved by the present exemplary embodiment is that it is not possible to know an appropriate communication failure recovery method to be used in a network having a plurality of communication failure recovery methods.

In this regard, in order to solve the aforementioned first problem, the present exemplary embodiment estimates a communication failure recovery time by a communication failure recovery method and decides a communication failure recovery method to be used. In this way, the present exemplary embodiment obtains an effect that it is possible to know an appropriate communication failure recovery method to be used in a network having a plurality of communication failure recovery methods. If communication devices of each layer intend to perform communication failure recovery methods according to respective independent determinations, it is not possible to determine a communication failure recovery method appropriate to an entire communication system. Furthermore, they separately perform communication failure recovery methods, resulting in the occurrence of redundant and wasteful processing.

On the other hand, according to the present exemplary embodiment, in a network having a plurality of communication failure recovery methods, a communication control device, which unitarily performs path control in each layer of an entire network, estimates a communication failure recovery time and can perform an appropriate communication failure recovery method based on the estimation result. Furthermore, each communication device receives an instruction of the communication control device and initially performs a communication failure recovery method. That is, even though there is no instruction of the communication control device, the communication device does not perform inappropriate communication failure recovery methods or communication failure recovery methods having redundant content according to its own determination. This is an effect obtained by applying the present exemplary embodiment to the communication control device which unitarily performs the path control of the entire network.

Furthermore, the second problem solved by the present exemplary embodiment is that it is not possible to know an appropriate communication failure recovery method to be used in order to satisfy a constraint of the obtained communication failure recovery time.

In this regard, in order to solve the aforementioned second problem, the present exemplary embodiment estimates whether a communication failure recovery time based on a communication failure recovery method satisfies the constraint of the obtained communication failure recovery time and decides a communication failure recovery method. In this way, the present exemplary embodiment obtains an effect that it is possible to know an appropriate communication failure recovery method to be used in order to satisfy the constraint of the obtained communication failure recovery time.

Moreover, the third problem solved by the present exemplary embodiment is that it is not possible to know a constraint of a communication failure recovery time obtained by communication performed by a user.

In this regard, in order to solve the aforementioned third problem, the present exemplary embodiment estimates the communication failure recovery time obtained by the communication performed by the user and employs the estimation time as a constraint. In this way, the present exemplary embodiment obtains an effect that it is possible to know the constraint of the communication failure recovery time obtained by the communication performed by the user.

Moreover, the fourth problem solved by the present exemplary embodiment is that it is not possible to know a communication failure recovery time to be satisfied in order to prevent the performance of TCP/IP communication of a user from being largely impaired.

In this regard, in order to solve the aforementioned fourth problem, the present exemplary embodiment estimates a time of retransmission timeout for improving communication performance in the TCP/IP communication widely used and employs the estimation time as a constraint of a communication failure recovery time. In this way, the present exemplary embodiment obtains an effect that it is possible to estimate the communication failure recovery time to be satisfied in order to prevent the performance of the TCP/IP communication of a user from being largely impaired.

The present application is based on Japanese Patent Application No. 2013-203900 filed Sep. 30, 2013 and claims priority under the Paris Convention based on Japanese Patent Application No. 2013-203900. The content of Japanese Patent Application No. 2013-203900 is incorporated herein by reference.

The representative exemplary embodiments of the present invention have been described in detail, but it is noted that various changes, substitutions, and alternatives can be made without departing from the spirit and scope of the present invention defined by the appended claims. Furthermore, the inventors intend that an equivalent range of the claimed invention is kept even if the claims have been amended in the application procedures.

A part or the whole of the aforementioned exemplary embodiments are also written in the following supplementary notes, but the aforementioned exemplary embodiments are not limited thereto.

(Supplementary note 1) A communication control device that, when a communication failure occurs at a place in a first path for the communication that extends across a plurality of communication layers, selects a second path from a candidate group including one or more second paths for continuing communication without going via the place where the communication failure has occurred, based on required time with respect to each of the second paths for switching from the first path to the second path, and sends an instruction for switching from the first path to the selected second path and continuing communication to a communication device for performing the switching.

(Supplementary note 2) The communication control device according to supplementary note 1, wherein the switching of the path is switching in some communication layers of the plurality of communication layers across which the first path extends, the first path going via the place where the communication failure has occurred, the candidate group includes a maximum number of paths among communication devices, which are positioned at both ends of the first path going via the place where the communication failure has occurred, as the second path, and a path of a layer below any layer is changed by switching in a communication device of any communication layer from an uppermost communication layer to a lowermost communication layer of the plurality of communication layers across which the first path extends.

(Supplementary note 3) The communication control device according to supplementary note 1 or 2, wherein the required time for switching the first path to the second path is estimated for each of candidates of the second path for continuing communication without going via the place where the communication failure has occurred, and one of the candidates of the second path is selected as a switched second path based on the estimated required time.

(Supplementary note 4) The communication control device according to supplementary note 3, wherein the second path, in which the estimated required time is smaller than a time at which data retransmission caused by the communication failure occurs, is selected as a changed second path from the candidate group.

(Supplementary note 5) The communication control device according to supplementary note 3 or 4, wherein the estimation is performed based on both a time required for transferring the instruction to a communication device receiving the instruction from the communication control device and a time required until the communication device having received the instruction ends the switching from the first path to the second path after receiving the instruction.

(Supplementary note 6) The communication control device according to supplementary note 5, wherein the time required until the communication device having received the instruction ends the switching from the first path to the second path after receiving the instruction is estimated based on a layer to which the communication device having received the instruction belongs.

(Supplementary note 7) A communication control system including a communication device that performs communication in at least a part of a plurality of communication layers and the communication control device according to any one of supplementary notes 1 to 6, wherein the communication device is configured to continue communication by performing switching to a path selected by the communication control device, in response to the instruction from the communication control device.

(Supplementary note 8) A communication control method performed by a communication control device, comprising:

when a communication failure occurs at a place in a first path for communication that extends across a plurality of communication layers, selecting a second path from a candidate group including one or more second paths for continuing communication without going via the place where the communication failure has occurred, based on time required with respect to each of the second paths for switching from the first path to the second path; and sending an instruction for switching from the first path to the selected second path and continuing communication to a communication device for performing the switching.

(Supplementary note 9) The communication control method according to supplementary note 8, wherein the switching of the path is switching in some communication layers of the plurality of communication layers across which the first path extends, the first path going via the place where the communication failure has occurred, the candidate group includes a maximum number of paths among communication devices, which are positioned at both ends of the first path going via the place where the communication failure has occurred, as the second path, and a path of a layer below any layer is changed by switching in a communication device of any communication layer from an uppermost communication layer to a lowermost communication layer of the plurality of communication layers across which the first path extends.

(Supplementary note 10) The communication control method according to supplementary note 8 or 9, wherein the required time for switching the first path to the second path is estimated for each of candidates of the second path for continuing communication without going via the place where the communication failure has occurred, and one of the candidates of the second path is selected as a switched second path based on the estimated required time.

(Supplementary note 11) The communication control method according to supplementary note 10, wherein the second path, in which the estimated required time is smaller than a time at which data retransmission caused by the communication failure occurs, is selected as a changed second path from the candidate group.

(Supplementary note 12) The communication control method according to supplementary note 10 or 11, wherein the estimation is performed based on both a time required for transferring the instruction to a communication device receiving the instruction from the communication control device and a time required until the communication device having received the instruction ends the switching from the first path to the second path after receiving the instruction.

(Supplementary note 13) The communication control method according to Supplementary note 12, wherein the time required until the communication device having received the instruction ends the switching from the first path to the second path after receiving the instruction is estimated based on a layer to which the communication device having received the instruction belongs.

(Supplementary note 14) A communication control method performed by a communication control system including a communication device that performs communication in at least a part of a plurality of communication layers and a communication control device, wherein the communication control device performs the method according to any one of supplementary notes 8 to 13, and wherein the communication device having received an instruction from the communication control device continues communication by performing switching to a path selected by the communication control device, in response to the instruction.

(Supplementary note 15) A communication control program causing a computer to serve as a communication control device that, when a communication failure occurs at a place in a first path for communication that extends across a plurality of communication layers, selects a second path from a candidate group including one or more second paths for continuing communication without going via the place where the communication failure has occurred, based on time required with respect to each of the second paths for switching from the first path to the second path, and sends an instruction for switching the first path to the selected second path and continuing communication to a communication device for performing the switching.

(Supplementary note 16) The communication control program according to supplementary note 15, wherein the switching of the path is switching in some communication layers of the plurality of communication layers across which the first path extends, the first path going via the place where the communication failure has occurred, wherein the candidate group includes a maximum number of paths among communication devices, which are positioned at both ends of the first path going via the place where the communication failure has occurred, as the second path, and wherein a path of a layer below any layer is changed by switching in a communication device of any communication layer from an uppermost communication layer to a lowermost communication layer of the plurality of communication layers across which the first path extends.

(Supplementary note 17) The communication control program according to supplementary note 15 or 16, wherein the required time for switching the first path to the second path is estimated for each of candidates of the second path for continuing communication without going via the place where the communication failure has occurred, and one of the candidates of the second path is selected as a switched second path based on the estimated required time.

(Supplementary note 18) The communication control program according to supplementary note 17, wherein the second path, in which the estimated required time is smaller than a time at which data retransmission caused by the communication failure occurs, is selected as a changed second path from the candidate group.

(Supplementary note 19) The communication control program according to supplementary note 17 or 18, wherein the estimation is performed based on both a time required for transferring the instruction to a communication device receiving the instruction from the communication control device and a time required until the communication device having received the instruction ends the switching from the first path to the second path after receiving the instruction.

(Supplementary note 20) The communication control program according to supplementary note 19, wherein the time required until the communication device having received the instruction ends the switching from the first path to the second path after receiving the instruction is estimated based on a layer to which the communication device having received the instruction belongs.

INDUSTRIAL APPLICABILITY

The present invention can be widely used for the purpose of communication control regardless of the types of communication methods.

The invention claimed is:

1. A communication control device that, when a communication failure occurs at a place in a first path for the communication that extends across a plurality of communication layers, selects a second path from a candidate group including one or more candidate second paths for continuing communication without going via the place where the communication failure has occurred, based on required times for switching from the first path to the one or more candidate second paths, and sends an instruction for switching from the first path to the selected second path of the candidate second paths and continuing communication to a communication device for performing the switching, wherein the required times are estimated for each one of the candidate second paths, and one of the candidate second paths is selected as the selected second path based on its estimated required time, and wherein the estimated required time of the selected second path is smaller than a time at which data retransmission caused by the communication failure occurs.

2. The communication control device according to claim 1, wherein the switching of the first path to the selected second path is switching in some communication layers of the plurality of communication layers across which the first path extends, the first path going via the place where the communication failure has occurred, wherein the candidate group includes a maximum number of paths among communication devices that are positioned at both ends of the first path going via the place where the communication failure has occurred, and wherein a path of the candidate group of a layer below any layer is changed by switching in a communication device of any communication layer from an uppermost communication layer to a lowermost communication layer of the plurality of communication layers across which the first path extends.

3. The communication control device according to claim 2, wherein the estimation of the required times for each one of the candidate second paths is performed based on both i) a time required for transferring the instruction to a communication device receiving the instruction from the communication control device and ii) a time required until the communication device having received the instruction ends the switching from the first path to the selected second path after receiving the instruction.

4. The communication control device according to claim 3, wherein the time required until the communication device having received the instruction ends the switching from the first path to the selected second path after receiving the instruction is estimated based on a layer to which the communication device having received the instruction belongs.

5. The communication control device according to claim 1, wherein the estimation of the required time for each one of the candidate second paths is performed based on both i) a time required for transferring the instruction to a communication device receiving the instruction from the communication control device and ii) a time required until the communication device having received the instruction ends the switching from the first path to the selected second path after receiving the instruction.

6. The communication control device according to claim 5, wherein the time required until the communication device having received the instruction ends the switching from the first path to the selected second path after receiving the instruction is estimated based on a layer to which the communication device having received the instruction belongs.

7. A communication control system including a communication device that performs communication in at least a part of a plurality of communication layers and the communication control device according to claim 1, wherein the communication device is configured to continue communication by performing switching to a path selected by the communication control device, in response to the instruction from the communication control device.

8. A communication control system, comprising:

a communication device that performs communication in at least a part of a plurality of communication layers; and the communication control device according to claim 2, wherein the communication device is configured to continue communication by performing switching to a path selected by the communication control device, in response to the instruction from the communication control device.

9. A communication control method performed by a communication control device, comprising:

selecting, when a communication failure occurs at a place in a first path for communication that extends across a plurality of communication layers, a second path from a candidate group including one or more candidate second paths for continuing communication without going via the place where the communication failure has occurred, based on required times for switching from the first path to the one or more candidate second paths; and sending an instruction for switching from the first path to the selected second path of the candidate second paths and continuing communication to a communication device for performing the switching, wherein the required times are estimated for each one of the candidate second paths, and one of the candidate second paths is selected as the selected second path based on its estimated required time, and wherein the estimated required time of the selected second path is smaller than a time at which data retransmission caused by the communication failure occurs.

10. The communication control method according to claim 9, wherein the switching of the first path to the selected second path is switching in some communication layers of the plurality of communication layers across which the first path extends, the first path going via the place where the communication failure has occurred, wherein the candidate group includes a maximum number of paths among communication devices that are positioned at both ends of the first path going via the place where the communication failure has occurred, and wherein a path of the candidate group of a layer below any layer is changed by switching in a communication device of any communication layer from an uppermost communication layer to a lowermost communication layer of the plurality of communication layers across which the first path extends.

11. The communication control method according to claim 10, wherein the estimation of the required times for each one of the candidate second paths is performed based on both i) a time required for transferring the instruction to a communication device receiving the instruction from the communication control device and ii) a time required until the communication device having received the instruction ends the switching from the first path to the selected second path after receiving the instruction.

12. The communication control method according to claim 11,
wherein the time required until the communication device having received the instruction ends the switching from the first path to the selected second path after receiving the instruction is estimated based on a layer to which the communication device having received the instruction belongs.

13. The communication control method according to claim 9,
wherein the estimation of the required time for each one of the candidate second paths is performed based on both i) a time required for transferring the instruction to a communication device receiving the instruction from the communication control device and ii) a time required until the communication device having received the instruction ends the switching from the first path to the selected second path after receiving the instruction.

14. The communication control method according to claim 13,
wherein the time required until the communication device having received the instruction ends the switching from the first path to the selected second path after receiving the instruction is estimated based on a layer to which the communication device having received the instruction belongs.

15. A non-transitory computer readable medium storing a communication control program causing a computer to serve as a communication control device that, when a communication failure occurs at a place in a first path for communication that extends across a plurality of communication layers, selects a second path from a candidate group including one or more candidate second paths for continuing communication without going via the place where the communication failure has occurred, based on required times for switching from the first path to the one or more candidate second paths, and sends an instruction for switching the first path to the selected second path of the candidate second paths and continuing communication to a communication device for performing the switching,
wherein the required times are estimated for each one of the candidate second paths, and one of the candidate second paths is selected as the selected second path based on its estimated required time, and
wherein the estimated required time of the selected second path is smaller than a time at which data retransmission caused by the communication failure occurs.

16. The non-transitory computer readable medium according to claim 15,
wherein the switching of the first path to the selected second path is switching in some communication layers of the plurality of communication layers across which the first path extends, the first path going via the place where the communication failure has occurred,
wherein the candidate group includes a maximum number of paths among communication devices that are positioned at both ends of the first path going via the place where the communication failure has occurred, and
wherein a path of the candidate group of a layer below any layer is changed by switching in a communication device of any communication layer from an uppermost communication layer to a lowermost communication layer of the plurality of communication layers across which the first path extends.

17. The non-transitory computer readable medium according to claim 16,
wherein the estimation of the required times for each one of the candidate second paths is performed based on both i) a time required for transferring the instruction to a communication device receiving the instruction from the communication control device and ii) a time required until the communication device having received the instruction ends the switching from the first path to the selected second path after receiving the instruction.

18. The non-transitory computer readable medium according to claim 17,
wherein the time required until the communication device having received the instruction ends the switching from the first path to the selected second path after receiving the instruction is estimated based on a layer to which the communication device having received the instruction belongs.

19. The non-transitory computer readable medium according to claim 15,
wherein the estimation of the required time for each one of the candidate second paths is performed based on both i) a time required for transferring the instruction to a communication device receiving the instruction from the communication control device and ii) a time required until the communication device having received the instruction ends the switching from the first path to the selected second path after receiving the instruction.

20. The non-transitory computer readable medium according to claim 19,
wherein the time required until the communication device having received the instruction ends the switching from the first path to the selected second path after receiving the instruction is estimated based on a layer to which the communication device having received the instruction belongs.

* * * * *